United States Patent
Wako

(10) Patent No.: US 7,814,435 B2
(45) Date of Patent: Oct. 12, 2010

(54) METHOD AND APPARATUS FOR DISPLAYING LOCAL BRAND ICONS FOR NAVIGATION SYSTEM

(75) Inventor: Hikaru Wako, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 277 days.

(21) Appl. No.: 11/998,189

(22) Filed: Nov. 29, 2007

(65) Prior Publication Data

US 2009/0144660 A1    Jun. 4, 2009

(51) Int. Cl.
G06F 3/048 (2006.01)
G06F 3/00 (2006.01)

(52) U.S. Cl. ............... 715/835; 715/851; 715/855; 715/862; 715/863

(58) Field of Classification Search ......... 715/762–767, 715/835, 851, 855; 701/204, 209
See application file for complete search history.

(56) References Cited

U.S. PATENT DOCUMENTS

| | | | |
|---|---|---|---|
| 6,836,728 B2 | 12/2004 | Shimabara | |
| 6,983,203 B1 | 1/2006 | Wako | |
| 2003/0191578 A1* | 10/2003 | Paulauskas et al. | 701/200 |
| 2004/0054428 A1* | 3/2004 | Sheha et al. | 700/56 |
| 2004/0243306 A1* | 12/2004 | Han | 701/211 |
| 2005/0165543 A1* | 7/2005 | Yokota | 701/204 |
| 2006/0253247 A1 | 11/2006 | de Silva et al. | |
| 2007/0118281 A1* | 5/2007 | Adam et al. | 701/211 |
| 2007/0276596 A1* | 11/2007 | Solomon et al. | 701/211 |
| 2008/0036778 A1* | 2/2008 | Sheha et al. | 345/502 |
| 2008/0082262 A1* | 4/2008 | Silva et al. | 701/211 |
| 2008/0125966 A1* | 5/2008 | Yamazaki | 701/208 |
| 2008/0208447 A1* | 8/2008 | Geelen et al. | 701/201 |
| 2008/0228393 A1* | 9/2008 | Geelen et al. | 701/208 |
| 2009/0037101 A1* | 2/2009 | Koike et al. | 701/209 |
| 2009/0088964 A1* | 4/2009 | Schaaf et al. | 701/200 |

* cited by examiner

Primary Examiner—Tadeese Hailu
(74) Attorney, Agent, or Firm—Muramatsu & Associates

(57) ABSTRACT

A method and apparatus for a navigation system displays local brand icons in such a way that a user not familiar with the local brand icons can tell the types of business that the brand icons represent through graphic representations on a screen of the navigation system. The method includes the step of creating an icon database regarding generic icons and brand icons where the icon database includes information for distinguishing a local brand icon from a national brand icon, displaying the icons over a map image on a screen of a navigation system, detecting whether there is any local brand icon displayed on the screen, and indicating a business category of a business entity using the local brand icon when the local brand icon is detected on the screen.

20 Claims, 9 Drawing Sheets

Fig. 2A       Fig. 2B       Fig. 2C
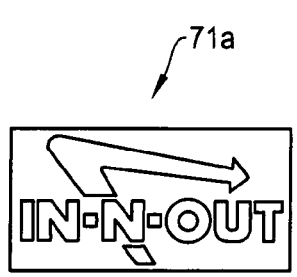
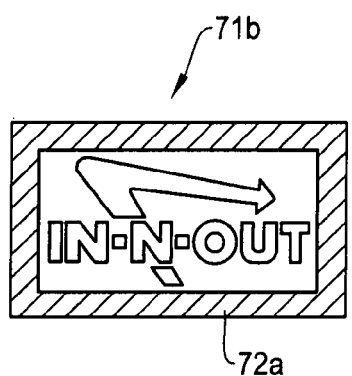
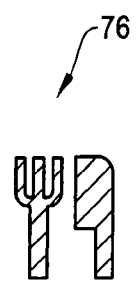
Fig. 3A       Fig. 3B
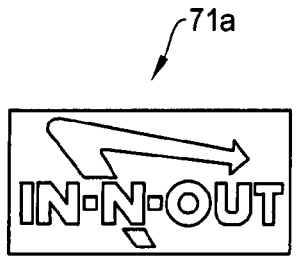
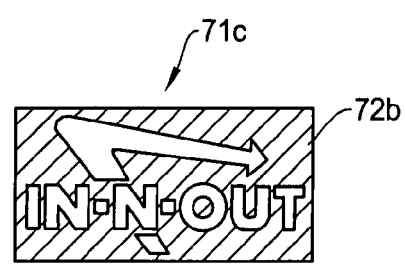

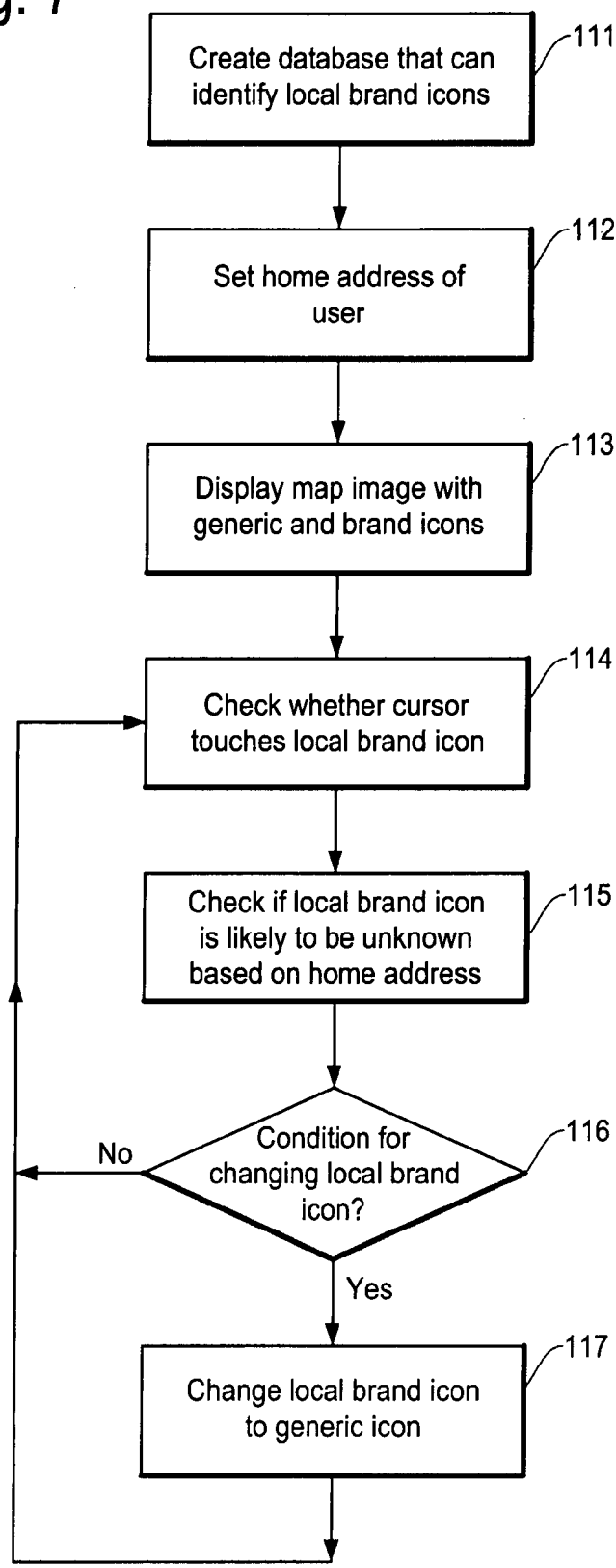

| | |
|---|---|
| ATM | ATM |
| Bank | $ |
| Gas Station | ⛽ |
| Lodge | 🏠P |
| Restaurant | 🍴 |
| Traffic Incident | 🚧 |

242

| | |
|---|---|
| Carl's Jr | ☆ |
| Chevron | ⌄ |
| Michael's | Michaels |
| Macy's | ☆macy's |
| McDonald's | M |
| In-and-Out (*local) | IN-N-OUT |

METHOD AND APPARATUS FOR DISPLAYING LOCAL BRAND ICONS FOR NAVIGATION SYSTEM

FIELD OF THE INVENTION

This invention relates generally to a method and apparatus for displaying icons on a screen of a navigation system, and more particularly, to a method and apparatus for displaying local brand icons in such a way that a user not familiar with the local brand icons can tell the types of business that the brand icons represent through graphic representations on the navigation system.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen while superimposing thereon a mark representing the current location of the user. At an intersection on the calculated route, the navigation system notifies the user which direction to turn at the intersection, if necessary.

Such a navigation system is designed to display a map image and various types of icons and map elements on the screen so that the user is able to obtain various information through graphical representations on the screen. Typically, icons related to types of business such as POI (point of interest) icons will be displayed when a scale factor of the map image on the screen becomes smaller than a predetermined value. Such POI icons will be displayed at locations on the map image that correspond to the actual business locations of the entities represented by the icons.

Typically, such POI icons can be classified into generic icons and brand icons where generic icons represent categories or types of business such as restaurant, gas station, banks, etc., while brand icons represent individual businesses. A generic icon will not differentiate a individual business from the others in the same category but simply indicates the category of the POIs. Thus, fast food restaurants such as "McDonald", "Burger King", "Pizza Hut", etc., are represented by the same generic icon indicting the category of restaurant. However, a brand icon will differentiate an individual business from the other, thus, for example, a brand icon of "McDonald" will distinguish the "McDonald" restaurant from the other restaurants.

However, not all brand icons are instantly recognizable by every one. Although national brand icons (icons that are used throughout the country) can be recognized by most users, there are brand icons that can only be recognized by users familiar with a particular local area. For instance, some restaurant chains operate locally, such as only in the western states such as California, Nevada and Arizona, but not in the other states. In such a case, a brand icon, such as a restaurant logo, that is easily recognizable to many users in California may not be easily recognizable to users from the other states such as from New York.

FIGS. 1A and 1B are schematic diagrams showing map images on the screen of the navigation system that illustrate a plurality of icons including generic icons as well as brand icons. In the example of FIG. 1A, the screen shows generic icons 27d for restaurants, a generic icon 27e for a hotel/lodging, generic icons 27f for gas stations, as well as a brand icon 27a for a restaurant, brand icons 27b for gas stations, and another brand icon 27c for a restaurant.

In the example of FIG. 1B, in addition to the same generic icons and brand icons of FIG. 1A, it also includes brand icons 27g for restaurants. In this example, the brand icons 27a and 27c are national brand icons, which are assumed to be well known and used throughout the country. In contrast, it is assumed that the brand icon 27g is a local brand icon which is known and used only within a particular local area. Thus, the users who are not familiar with the particular local area are not likely to recognize the local brand icons 27g.

Brand icons are not very useful if they do not provide the function of indicating what kinds of business they represent. Thus, it is desired to develop a means through which the users not familiar with a particular brand icon is able to judge or guess a category of business the brand icon represents. Especially, it is desired a new method and apparatus for a navigation system that can achieve such a function through graphic representations on the screen.

SUMMARY OF THE INVENTION

It is, therefore, an object of the present invention to provide a method and apparatus for a navigation system which is capable of displaying a local brand icon in such a way that a user who is not familiar with the local brand icon can tell the category of business that the local brand icon represents through graphic representations.

It is another object of the present invention to provide a method and apparatus for a navigation system which is capable of displaying a local brand icon while adding a predetermined color indicating a category of business that associated with the local brand icon.

It is a further object of the present invention to provide a method and apparatus for a navigation system which is capable of displaying a local brand icon while incorporating a predetermined shape indicating a category of business that associated with the local brand icon.

It is a further object of the present invention to provide a method and apparatus for a navigation system which is capable of displaying a local brand icon and changing the local brand icon to a generic icon indicating the category of business that associated with the local brand icon when predetermined conditions are met.

It is a further object of the present invention to provide a method and apparatus for a navigation system which is capable of displaying a local brand icon and changing the local brand icon to a generic icon indicating the category of business that associated with the local brand icon when it is determined the local brand icon is likely to be unfamiliar with the user.

One aspect of the present invention is a method for displaying icons for a navigation system. The method includes the steps of: creating an icon database regarding generic icons and brand icons where a generic icon indicates a category of business and a brand icon indicates a specific business entity, the icon database including information for distinguishing a local brand icon that is locally used or known from a national brand icon that is nationally used or known; displaying the icons over a map image on a screen of a navigation system; detecting whether there is any local brand icon displayed on the screen; and indicating a business category of a business entity using the local brand icon when the local brand icon is detected on the screen.

In the method of the present invention for displaying icons noted above, the step of indicating the business category includes a step of applying a color to the local brand icon where the color applied to the local brand icon is identical to that of a generic icon that shows a business category identical to that of the business entity using the local brand icon.

In another aspect, the step of applying a color to the local brand icon is conducted by incorporating a color frame around the local brand icon where the color of the color frame is identical to that of the generic icon. Alternatively, the step of applying a color to the local brand icon is conducted by incorporating a background color to the local brand icon where the background color is identical to the color of the generic icon.

In a further aspect, the step of indicating the business category includes a step of changing or applying a shape to the local brand icon so that the local brand icon and a generic icon that shows a business category identical to that of the business entity using the local brand icon have a shape identical to one another.

In a further aspect, the step of indicating the business category includes a step of changing the local brand icon to a generic icon that shows a business category identical to that of the business entity using the local brand icon. In a further aspect, the step of indicating the business category includes a step of changing the local brand icon to a generic icon that shows a business category identical to that of the business entity using the local brand icon when a cursor is placed on or pointed to the local brand icon on the screen.

The method of the present invention for displaying icons noted above further includes a step of determining a home address of a user of the navigation system to evaluate whether a particular local brand icon on the screen is familiar to the user based on the home address. The icon database includes information on locations associated with local brand icons, and wherein the locations associated with the local brand icons are used to evaluate whether a particular local brand icon on the screen is familiar to the user by comparing the home address of the user with the location of the particular brand icon.

In a further aspect, the icon database includes information on locations associated with local brand icons where local brand icons are used or locations where business entities using the local brand icons exist, and wherein the information on the locations are used to evaluate whether a particular local brand icon on the screen is familiar to the user by comparing the home address of the user with the location of the particular local brand icon.

Another aspect of the present invention is a local brand icon display apparatus for a navigation system for implementing the steps defined in the local brand icon display methods of the present invention noted above. The apparatus includes various means to indicate a category of the business associated with the brand icon by incorporating various schemes such as adding predetermined colors, predetermined shapes, estimation based on addresses, cursor position, etc. on the screen. The local brand icon display apparatus dynamically changes the local brand icon to the corresponding generic icon, or vice versa, to show the business category of the local brand icon involved.

According to the present invention, when the brand icons are displayed on the screen, the navigation system judges whether a particular brand icon is a nationally known brand icon or only a locally known brand icon. The navigation system displays the local brand icon in such a way that a user who is not familiar with the local brand icon can tell the category of business that the local brand icon represents through graphic representations. Alternatively, the navigation system displays the local brand icon while adding the predetermined color indicating the category of business that associated with the local brand icon. The navigation system displays the local brand icon while using the predetermined shape indicating the category of business that associated with the local brand icon. In the present invention, the navigation system determines whether a particular local brand icon is likely to be unfamiliar with the user, and if so, the navigation system changes the local brand icon to a generic icon indicating the category of business that associated with the local brand icon when predetermined conditions are met.

BRIEF DESCRIPTION OF THE DRAWINGS

FIGS. 2A-2C are schematic diagrams showing a color differentiation scheme under the present invention where a color frame is used for a local brand icon whose color matches the color of a generic icon that represents the category of business identical to that associated with the local brand icon.

FIGS. 3A and 3B are schematic diagrams showing another example of a color differentiation scheme under the present invention where a predetermined color is used as a background color of a particular local brand icon to identify the category of business associated with the local brand icon.

FIG. 7 is a flow chart showing an example of basic operational steps involved in the cursor response scheme under the present invention shown in FIGS. 6A and 6B to change the displayed icon from the local brand icon to the corresponding generic icon.

FIG. 10 is a schematic diagram showing an example of data tables incorporated in the brand icon display method and apparatus of the present invention, one data table stores the generic POI icons and the other stores the national and local brand icons.

DETAILED DESCRIPTION OF THE PREFERRED EMBODIMENT

Figure 1A:
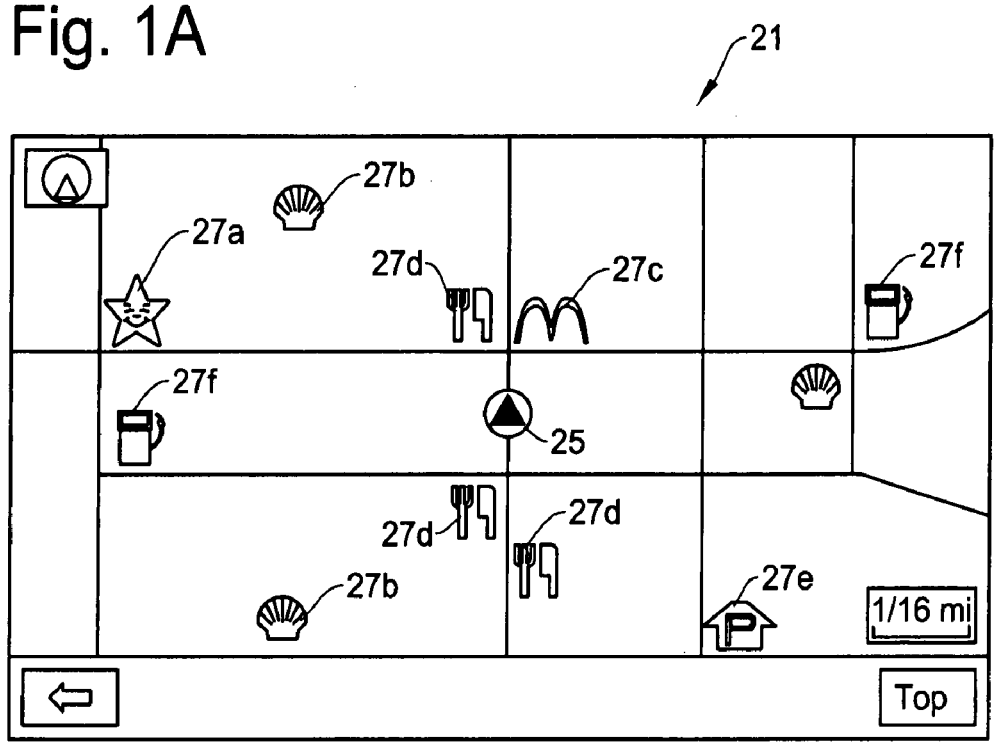
FIGS. 1A and 1B are schematic diagrams showing display examples on the screen of a navigation system where generic icons, local brand icons, and national brand icons are displayed on the map image.
Figure 1B:
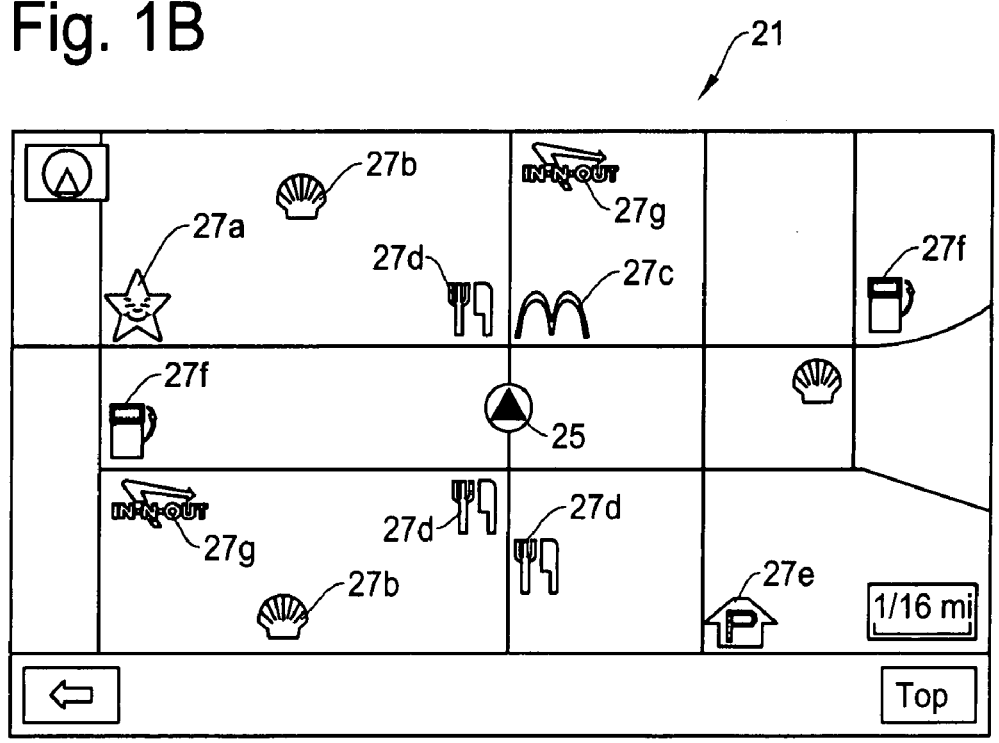

The method and apparatus for displaying local brand icons under the present invention is described with reference to the accompanied drawings. In the following, the description will be made mainly for the case where the brand icon display method and apparatus is applied to a vehicle navigation system. However, the brand icon display method and apparatus under the present invention can be implemented to other devices having a function of displaying map images and icons, such as portable navigation devices, PDAs (personal digital assistants), cellular phones, personal computers, etc.

The method and apparatus of the present invention for displaying generic icons and brand icons, especially, local brand icons, utilizes several methods or schemes which may be implemented singly or in combination to assist a user to determine what type of business a particular local brand icon represents. More specifically, the method and apparatus for displaying generic icons and brand icons under the present invention utilizes a color differentiation scheme, a shape differentiation scheme, a home location differentiation scheme, and a cursor response scheme. Those various schemes and the associated display examples will be described in more detail below.

To carry out the above noted schemes, a data table or a database for listing generic icons and brand icons will be created in the map database or other memory in advance, an example of which is shown in FIG. 10 as will be described later. Especially, such a data table includes information for distinction of a local brand icon that is locally known or used from brand icons that are nationally known or used, information regarding the locations of the business entities using the brand icons, etc. The information regarding the locations of the business entities represented by the brand icons or the locations where the brand icons are used may be used for determining whether a user is familiar with a particular local brand icon based on the user's address, etc. The data regarding the generic icons, national and local brand icons in the data table will be updated by the user or the manufacturer of the navigation system.

With respect to the above noted schemes, the color differential scheme is to differentiate a category of business associated with a particular local brand icon by adding or changing a color where color coding of generic icon is applied to a local brand icon. FIGS. 2A-2C are schematic diagrams showing the color differentiation scheme under the present invention where a color frame is used for a local brand icon. In this scheme, a color that matches the color of a generic icon that represents the business category identical to that of the local brand icon is applied to the frame of the local brand icon.

FIG. 2A is a schematic diagram showing an example of a local brand icon 71a representing an "In-and-Out" burger shop. Within the context of the present invention, it is assumed that the brand icon 71a representing the "In-and-Out" burger (restaurant) is a local brand icon which is known only locally such as within the state of California. Thus, it is assumed that residents outside of California are not familiar with this particular brand icon and that if the user from the outside of California sees the local brand icon 71a, the user is not able to know the type of business represented by the brand icon 71a.

In the color differentiation scheme of the present invention, the navigation system detects whether there is a local brand icon displayed on the screen, and if so, the navigation system changes the local brand icon 71a of FIG. 2A to a brand icon 71b where a color frame 72a is added around the original local brand icon as shown in FIG. 2B. As also shown in FIG. 2C, a generic icon 76 indicating a category of restaurant has a color that is identical to that of the color frame 72a of the bran icon 71b. In other words, in this method, the preexisting or newly established color coding for generic icons showing the categories of points of interest (business entities) is employed to local brand icons for indicating a category of business entity represented by a particular local brand icon.

Typically, with respect to the existing navigation systems, each generic icon indicating a category of point of interest is assigned with a unique color. For example, a restaurant category is assigned with a color of orange and a hotel category is assigned with a color of blue, etc. As shown in the example of FIG. 2C, since the color of the generic icon 76 indicating the restaurant is orange, the color frame 72a of the local brand icon 71b of FIG. 2B is colored orange, thereby indicating the category of restaurant that the local brand icon 71b is associated with.

Due to the color differentiation scheme described above, the user can recognize what kind of business category each brand icon represents even if the user is not familiar with a particular brand icon. Likewise, if a particular brand icon which is not nationally known is owned by a business entity of another category, a color that is unique to such a particular category is applied as well. For example, the color frame of a local brand icon for a local hotel will be illustrated by a color of blue since the color of the generic icon for the hotel category is blue in the above example. Alternatively, the colored frame for the brand icons may be used for all the brand icons regardless of whether particular brand icons are nationally known or only locally known.

FIGS. 3A and 3B are schematic diagrams showing another example of the color differentiation scheme under the present invention where a predetermined color is used as a background color of a particular local brand icon to identify the business category associated with the local brand icon. Namely, in order to indicate a category of the point of interest such as a business entity represented by a local brand icon, the color of the background of the local brand icon will be changed to that of the generic icon. Thus, the local brand icon 71a of FIG. 3A is changed to an icon 71c where its background 72b is provided with the color that is identical to that of the generic icon 76 (FIG. 2C) as shown in FIG. 3B. Alternatively, the colored background for the brand icons may be used for all the brand icons regardless of whether they are nationally or locally known.

Figure 4A:
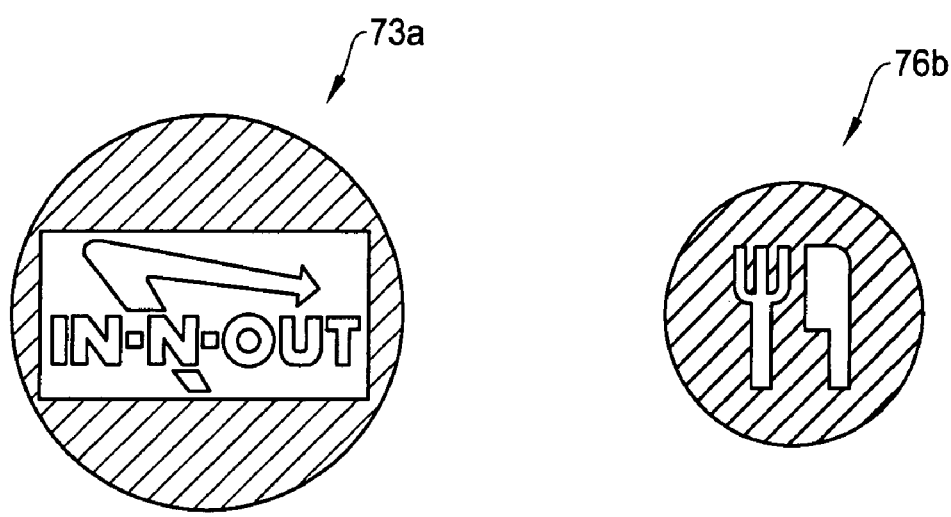
FIGS. 4A and 4B are schematic diagrams showing an example of a shape differentiation scheme under the present invention where a predetermined shape is used consistently for both a generic icon and a local brand icon of the same category to identify the category of the business associated with the local brand icon.
Figure 4B:
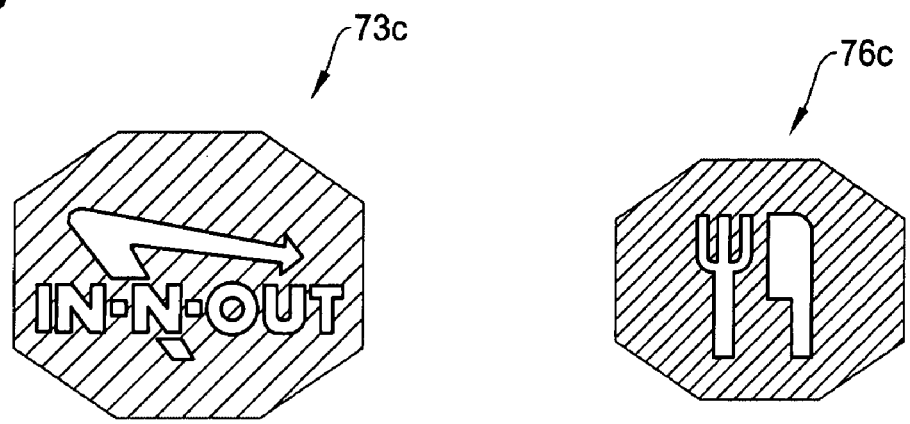

Under the shape differentiation scheme, the navigation system will change the shape of a particular brand icon and a generic icon to be the same to show that the business category is the same with one another. FIGS. 4A and 4B are schematic diagrams showing an example of the shape differentiation scheme under the present invention. In this method, a predetermined shape is used consistently for both a generic icon and a local brand icon of the same business category to identify the business category of the entity represented by a particular local brand icon.

The navigation system detects whether there is a local brand icon displayed on the screen, and if so, the navigation system changes the shapes of the local brand icon and the corresponding generic icon to be the same with one another. Thus, in the example of FIG. 4A, both a brand icon 73a and a generic icon 76b showing the restaurant category commonly have a circular shape, thereby showing the business category of the entity using the local brand icon 73*a*.

The shape is not limited to the example of FIG. 4A but may take other shape as necessary such as shown in FIG. 4B in which a hexagonal shape is applied to both a local brand icon 73*c* and a generic icon 76*c*. Different shapes are used for different POI categories in a consistent manner so that the user is able to tell what business type a particular brand icon represents even if the user does not know the particular brand icon. As indicated by hatches shown in FIGS. 4A and 4B, the color scheme noted above may also be used in combination with the shape distinction.

Figure 5A:
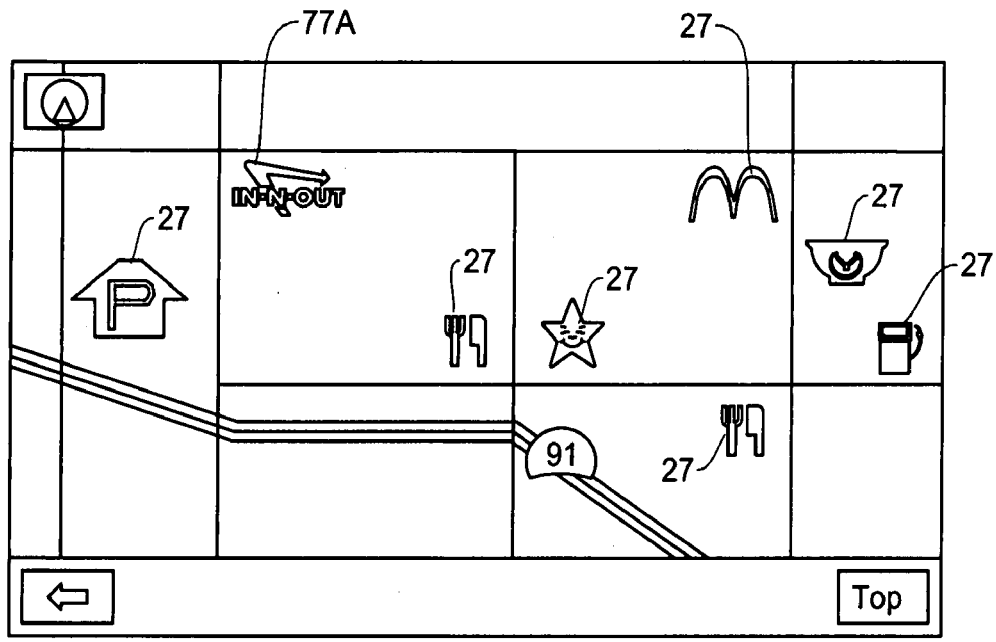
FIGS. 5A and 5B are schematic diagrams showing an example of a home location differentiation scheme under the present invention where a navigation system estimates whether a user is likely to be familiar with a local brand icon by means of the user's home address and the location of the business associated with the local brand icon.
Figure 5B:
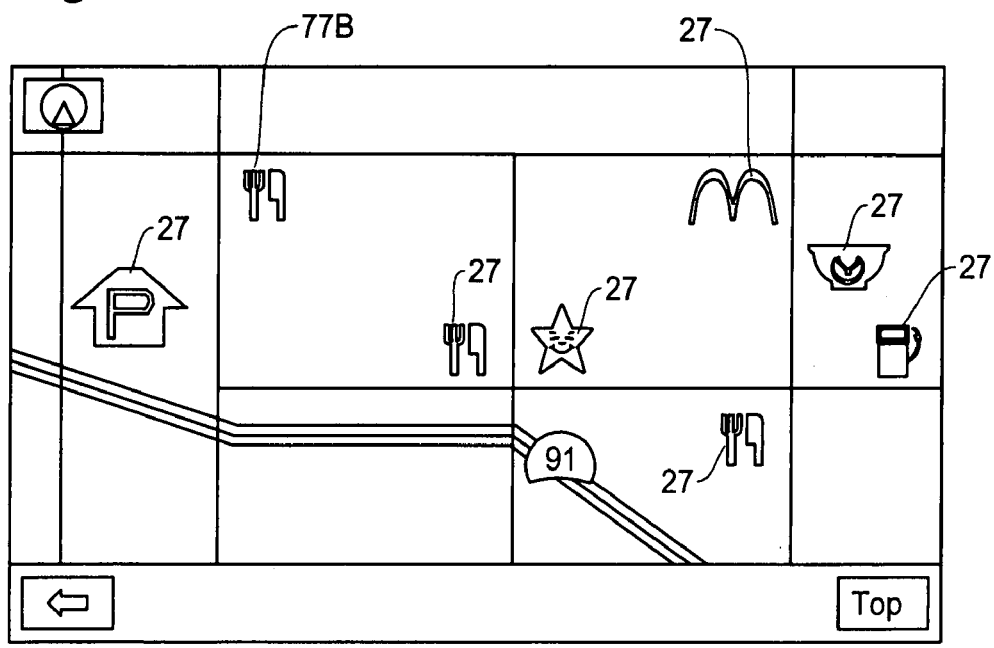

The home location differentiation scheme evaluates a user's home location as a reference to determine whether a particular brand icon is likely to be unfamiliar to a user or not. FIGS. 5A and 5B are schematic diagrams showing an example of the home location differentiation scheme under the present invention where the navigation system estimates whether the user is likely to be familiar with a local brand icon by means of the user's home address. For doing this, the navigation system compares the location where the local brand icon is used (typically, the location of the business entity using the local brand icon) and the home location of the user. The home location may be typically recorded in the navigation system by the user at the system set-up procedure of the navigation system.

In this scheme, for instance, if the home location of the user is set as Oklahoma, the navigation system will determine that the user is not likely to be familiar with a brand icon for restaurant chains that operate locally in the states far from Oklahoma. In such a case, the navigation system changes a particular local brand icon to a generic icon so that the user can tell the category of the business represented by the local brand icon. FIG. 5A is a display example if the navigation system determines that the user is familiar with the local brand icon 77A. In contrast, FIG. 5B is a display example if the navigation system determines that the user is likely to be unfamiliar with the local brand icon 77A thus changes the local brand icon 77A to a generic icon 77B showing the business category identical to that of the entity using the local brand icon 77A.

The map images of FIGS. 5A and 5B include various icons 27 some of which are generic icons that show categories of business and some of which are brand icons which are nationally known. Suppose the brand icon 77A in FIG. 5A is a local brand icon, i.e., only used or known in a local area such as within particular states, such as California and Arizona, and the user's home address is not in the either state. Then, when detecting the local brand icon 77A on the screen, the navigation system changes the local brand icon 77A to the generic icon 77B as shown in FIG. 5B.

Since the local brand icon 77A is changed to the generic icon 77B, the user is able to recognize the type of business that the local brand icon represents. It is also possible to alternately display the local brand icon 77A and the generic icon 77B at the same spot on the screen to show the relationship between the two. In such an example, the navigation system alternately shows the local brand icon 77A and the generic icon 77B at an appropriate speed of repetition such as every 0.3-0.7 seconds.

Figure 6A:
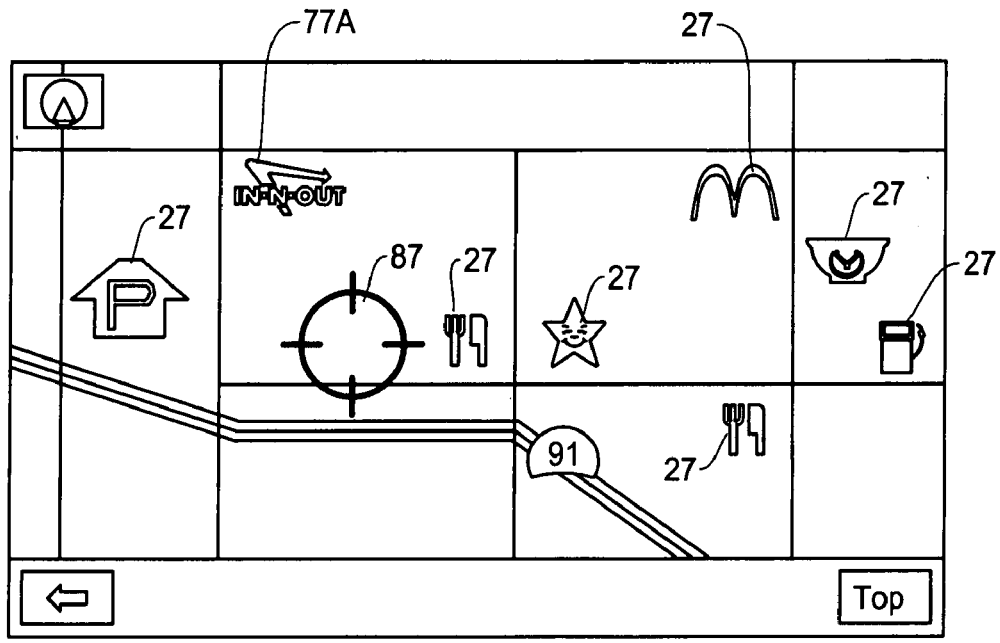
FIGS. 6A and 6B are schematic diagrams showing an example of a cursor response scheme under the present invention where a navigation system changes a local brand icon into a generic icon when a cursor is placed on the local brand icon if it is estimated through the user's home address and the location where the local brand icon is used that the user may not be familiar with the local brand icon.
Figure 6B:
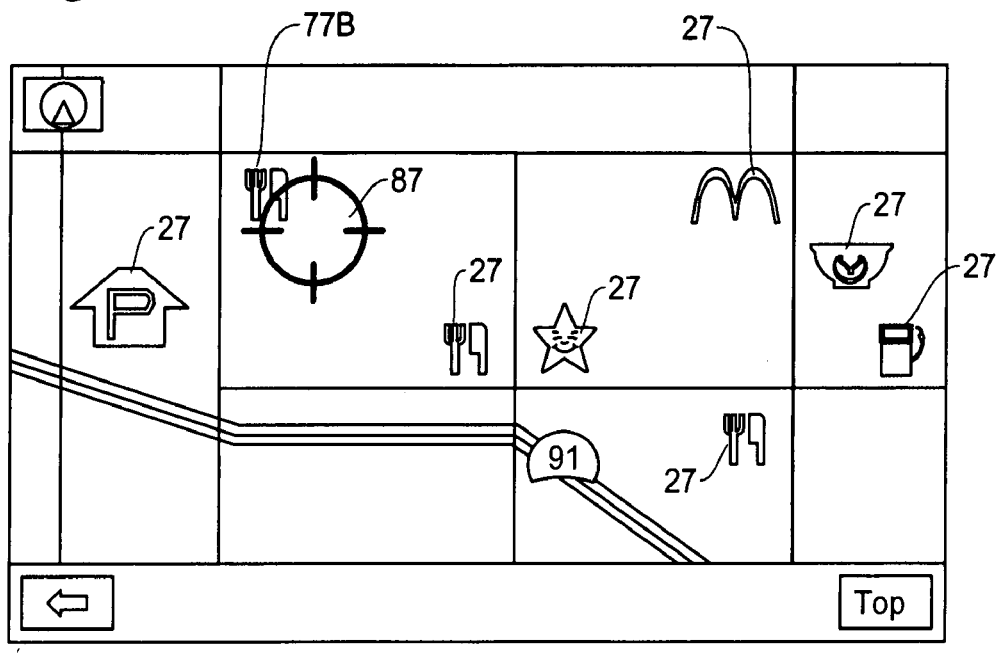

Similar to the example of FIGS. 5A and 5B, the cursor response scheme detects a local brand icon and changes the local brand icon to a generic brand icon on the screen in response to the movement of a cursor on the screen. FIGS. 6A and 6B are schematic diagrams showing an example of the cursor response scheme under the present invention where the navigation system changes a local brand icon to a generic icon indicating the business category when a cursor is placed on the local brand icon or the cursor is pointed to the local brand icon. This scheme is typically activated when the navigation system estimates, through the user's home address and the location or area where the local brand icon is used, that the user is not likely to be familiar with the local brand icon on the screen.

The map image of FIG. 6A is the same as that of FIG. 5A with all the brand icons and the generic icons except that a cursor 87 is shown on the screen of FIG. 6A. As shown in FIG. 6A, in a normal operation, the navigation system shows a local brand icon 77A in an ordinary form. When the user operates an input device and moves the cursor 87 to touch or point the local brand icon 77A, the navigation system switches the local brand icon 77A to the generic icon 77B to indicate the category of the business associated with the local brand icon 77A.

Alternatively, the cursor response scheme may also function by reversing the relationship between the generic icon 77B and the local brand icon 77A. That is, the navigation system first displays the generic icon 77B on the map image to show the business category, which will be changed to the local brand icon 77A when the user moves the cursor 87 to the generic icon 77B. As a consequence, the user is able to know the type of business represented by the particular local brand icon even when the user does not know the local brand icon.

The procedure for displaying a local brand icon under the present invention is described with reference to the flow chart of FIG. 7. The example of FIG. 7 is directed to the procedure that includes the home address differentiation scheme and the cursor response scheme described above with reference to FIGS. 5A-5B and 6A-6B. In the step 111, a data table for listing the generic icons and the brand icons will be created in the map data storage or other memory of the navigation system. In the example of icon display apparatus shown in FIG. 8, the data table or database is created in a memory 148 separately from the map data storage as will be described in detail later.

Especially, such a data table includes information for differentiating the local brand icons that are not nationally known or used from the brand icons that are nationally known or used, and information regarding the category of business entities associated with the brand icons, the locations of the business entities or locations where the local brand icons are used, etc. The information regarding the locations related to the local brand icons may be used for determining whether a user is familiar with a particular local brand icon in combination with the information on user's address, etc. Such information regarding the local brand icons in the data table can be updated by the user or by the manufacturer of the navigation system.

In the step 112, a home address of the user will be set in the navigation system so that the navigation system is able to estimate whether the user is likely to be familiar with a particular local brand icon. A home address may be typically recorded in the navigation system by the user at the system set-up procedure of the navigation system. Based on such information, if the home address of the user is in the state of "Kansas", the navigation system determines that the user is not likely to be familiar with a local brand icon for restaurant chains that operate locally in the state of "California" far from Kansas.

In the step 113, when the user selects a mode for displaying a map image with POI icons, the brand icons as well as generic icons will be displayed on the screen of the navigation system. Typically, if the map scale is smaller than a predetermined scale, such icons will be displayed at the locations on the map image where restaurant, stores or other business entities exist. The navigation system constantly checks whether the cursor operated by the user contacts the local brand icon on the screen in the step 114. The navigation system may skip the step 114 for carrying out the operation of only the home location differentiation scheme described with reference to FIGS. 5A and 5B.

In the step 115, the navigation system will determine whether the brand icon on the screen is likely to be familiar with the user. In this process, it is determined whether the brand icons is a local brand icon as opposed to a national brand icon based on the information listed in the data table created in the step 111. Such a determination is also made by checking whether the operating area of the business represented by the local brand icon is close to the home address of the user so that the user is familiar with the local brand icon.

Based on these criteria, the navigation system decides whether the conditions are met for changing the local brand icon to the corresponding generic icon in the step 116 to show a business category associated with the local brand icon. If the conditions are met, the navigation system displays the generic icon at the location of the local brand icon on the screen in the step 117 as shown in FIGS. 5B and 6B. If it is determined that the conditions are not met in the step 116, the navigation system will repeat the steps 114-116 described above.

As noted above, various criteria may be used to determine whether a particular local brand icon should be changed to a generic icon. One method is to determine whether an entity represented by a brand icon exists in the jurisdiction wherein the user's home is located. In other words, such a determination is made by comparing the location or area where the local brand icon is used and the home address of the user. In the case where distinction of such jurisdictions is a state base, the navigation system will determine whether a particular entity or business represented by the brand icon exists in the user's state.

If the entity represented by a particular brand icon exists in the states of California and Arizona only, and the home address of the user is in the state of Texas, the navigation system will judge that the user is not likely to know the type of business represented by the local brand icon. The unit of jurisdiction may be as small as county or city, or as large as a whole country, such as a unit of each European country, etc. Another method that can be utilized for this purpose is to evaluate the number of business entities (stores, restaurants) that are represented by a particular local brand icon exist within a certain distance range from the home address of the user.

For example, if a threshold number of three entities for a local brand icon within 100 miles of the home address is set, the navigation system will change the local brand icon to the generic icon on the display when the number of the entity that exists in the above criteria is less than three. Other threshold numbers, distances, may also be implemented to improve accuracy of estimation. For the home address, it is also feasible to set a plurality of home addresses for the purpose of determining whether the user is likely to be familiar with a particular local brand icon.

As noted above, typically, the user may manually enter one or more home addresses such as through the system set-up procedure. Alternatively, the navigation system may store locations to which the user frequently visits, and set some of those locations as home addresses or their equivalents for the purpose of determining the likelihood of familiarity by the user to the local brand icons. Moreover, once the user visits a business entity (point of interest) represented by a local brand icon, the navigation system may thereafter assume that the user is familiar with the particular local brand icon. Those local brand icons whose business entities have been visited by the user may be stored in the database (data table) of the navigation system so that the navigation system will display them without changing them to the corresponding generic icons in the future use.

The various schemes (methods) described above are not to be construed as mutually exclusive, but can be readily combined with one another to assist the user in understanding the information on the navigation system screen. For instance, the cursor response scheme may use the color frame method when a local brand icon that is determined to be not likely to be known by the user before contacting the cursor to the local brand icon. Then, when the cursor contacts the local brand icon on the screen, the navigation system changes the local brand icon to the generic icon.

Figure 8:
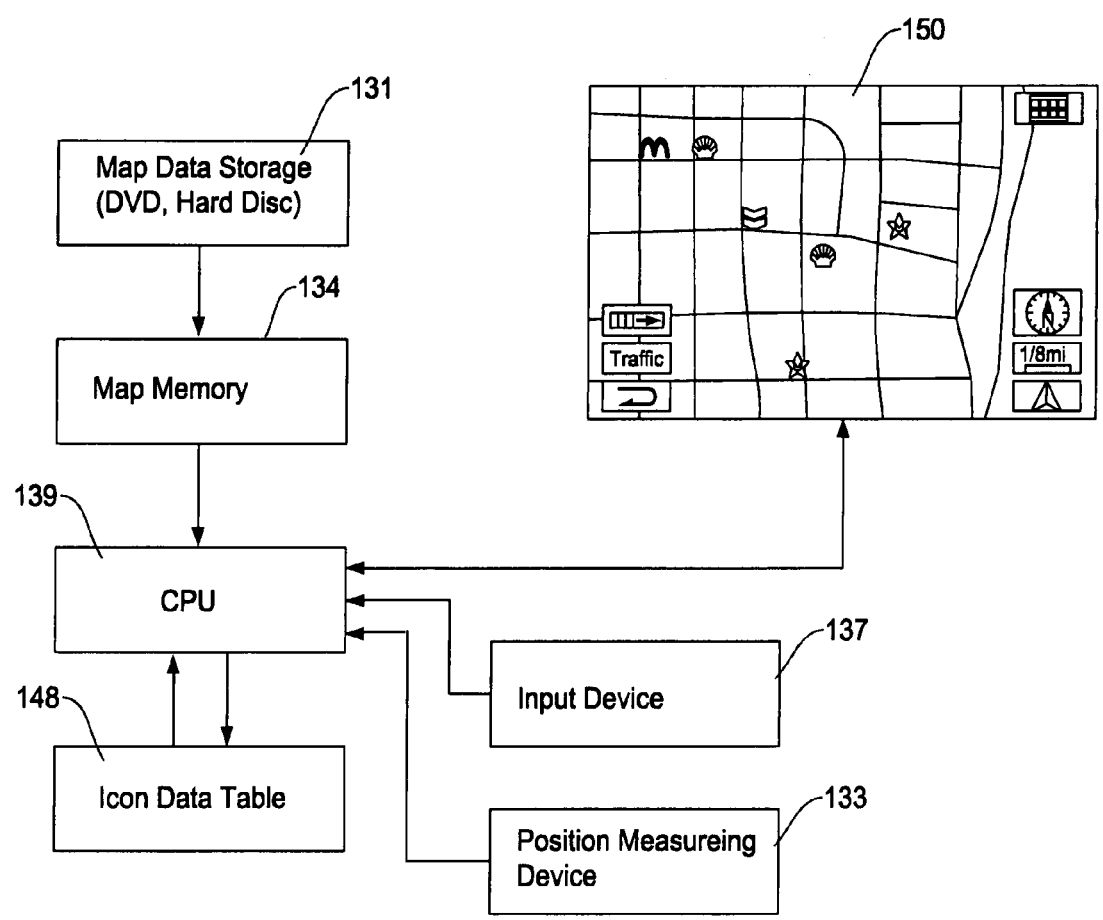
FIG. 8 is a block diagram showing an example of functional structure of the apparatus under the present invention for identifying the type of business concerning the local brand icons displayed on the screen.

FIG. 8 is a functional block diagram showing an example of basic structure of the local brand icon display apparatus of the present invention for showing a category of business associated with a local brand icon on the screen of the navigation system. The structure of FIG. 8 is applicable to any electronic device having a navigation function which enables the electronic device to guide the user to a particular location as noted above. The local brand icon display apparatus of the present invention includes a monitor 150 for graphical user interface, and a controller (CPU) 139 for controlling an overall operation of the apparatus of the present invention.

The block diagram of FIG. 8 further includes a map data storage 131 such as a DVD or a hard disc for storing map data, a map memory 134 for storing a required portion of the map data retrieved from the map data storage 131, an input device 137 such as a remote controller for the user to select menus, scroll the screen, change the location of the cursor on the screen, etc., a position measuring device 133 for detecting a current position of the user, and a buffer memory 148 for storing data such as a icon data table for processing the local brand icon display operation.

In FIG. 8, the local brand icon display apparatus of the present invention is able to retrieve the map data from the map data storage 131 and the map memory 134. Based on the retrieved map data, the display apparatus displays the map image on the monitor 150 which may include various icons. Such icons typically come out when the map scale is decreased to lower than a predetermined level by the user through the operation of the input device 137. The CPU 139 controls an overall operation of the local brand icon display operation under the present invention.

For conducting the cursor position scheme noted above with reference to FIGS. 6A and 6B, for example, when the user encounters a local brand icon unfamiliar to him/her on the screen, the user operates the input device 137 to bring the cursor on the screen to the local brand icon. As soon as the cursor contacts the local brand icon, the CPU 139 changes the local brand icon to the generic icon showing the business category of the entity using the local brand icon. Accordingly, the user is able to know the business category associated with the local brand icon shown on the screen.

Figure 9:
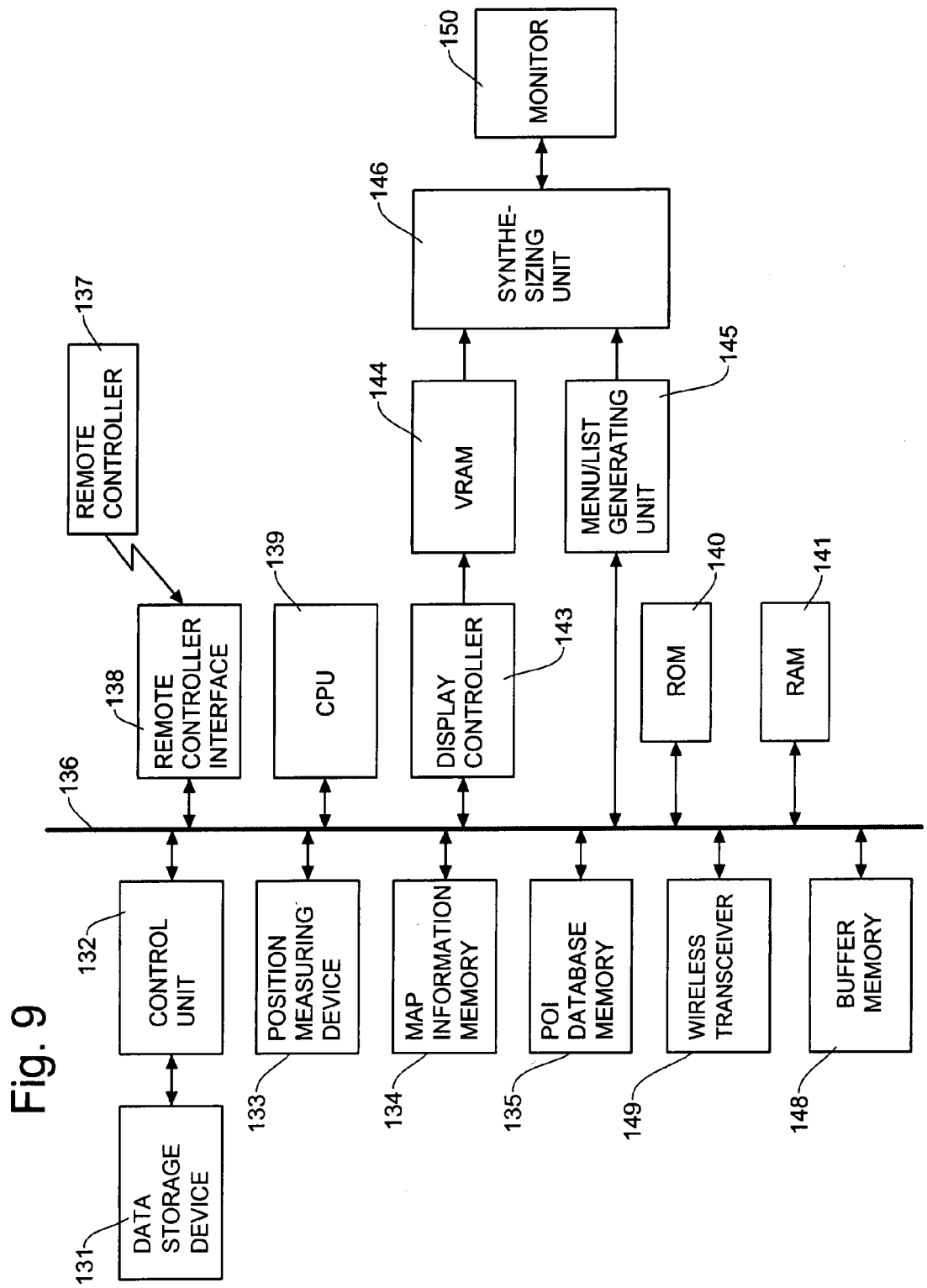
FIG. 9 is a block diagram showing an example of configuration of a vehicle navigation system implementing the method for displaying a local brand icon in accordance with the present invention.

FIG. 9 shows an example of structure of a vehicle navigation system for implementing the local brand icon display method of the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram of FIG. 9, the functional blocks similar to those of FIG. 8 are denoted by the same reference numerals. The navigation system includes a data storage medium 131 such as a hard disc, CD-ROM, DVD or other storage means for storing the map data. The navigation system includes a control unit 132 for controlling an operation for reading the information from the data storage medium 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving and analyzing GPS signals, and etc.

The block diagram of FIG. 9 further includes a map information memory 134 for storing a portion of the map data relevant to the intended operation of the navigation system which is read from the data storage medium 131, a database memory 135 for storing database information such as point of interest (POI) information which is read out from the data storage medium 131, a remote controller 137 for executing a menu selection operation, cursor movements, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller.

In FIG. 9, the navigation system further includes a bus 136 for interfacing the above functional blocks in the system, a processor (CPU) 139 for controlling an overall operation of the navigation system, a ROM 140 for storing various control programs such as a route search program and a map matching program necessary for navigation control as well as a local brand icon display program for the present invention, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a wireless transceiver 149 for wireless communication to retrieve data from a remote server, a buffer memory 148 for temporally storing data such as an icon data table for efficient operation for displaying the local brand icons in accordance with the present invention, and a monitor (display) 150.

The CPU 139 controls an overall operation of the navigation system including the local brand icon display operation under the present invention for determining a mode of operational schemes noted above, evaluating the familiarity by the user to a particular brand icon, changing the local brand icon to generic icon, etc. The data related to the generic icon and brand icons will be stored in the buffer memory 148 for further processing. As noted above, the navigation system conducts the process of selecting the appropriate scheme for displaying the local brand icon, determining the likelihood of the use's familiarity to the local brand icon, and changing the local brand icon to the corresponding generic icon.

A program that performs the procedure of the present invention including the one shown in the flow chart of FIG. 7 may be stored in the ROM 140 or other storage medium and is executed by the CPU 139. As noted above, the buffer memory 148 may be used for storing the icon data table for processing the operation for displaying the brand icons and generic icons under the present invention. Thus, even if the user is not familiar with a particular local brand icon, the user is able to know the type of business associated with the brand icon.

FIG. 10 is a schematic diagram showing an example of data tables or database incorporated in the local brand icon display method and apparatus of the present invention for storing various icons. In this example, a data table 241 stores a list of the generic icons which show categories of POIs such as gas station, restaurant, lodge, bank, etc., and traffic incident icons. A data table 242 stores a list of brand icons with their graphic representation and other information. In the data table 242, a particular brand icon which is locally known but not nationally known is so indicated that the CPU 139 can control the navigation system to conduct the local brand icon display schemes of the present invention described in the foregoing.

Although not shown, the data table further includes the information regarding the locations of the business entities using the brand icons or the locations where the local brand icons are used. Such information concerning the locations may be used for determining whether a user is familiar with a particular local brand icon in combination with the user's address, etc. Such information regarding the local brand icons in the data table can be updated by the user or by the manufacturer of the navigation system.

As has been described above, according to the present invention, when the brand icons are displayed on the screen, the navigation system judges whether a particular brand icon is a nationally known brand icon or only a locally known brand icon. The navigation system displays the local brand icon in such a way that a user who is not familiar with the local brand icon can tell the category of business that the local brand icon represents through graphic representations. The navigation system displays the local brand icon while adding the predetermined color indicating the category of business that associated with the local brand icon. Alternatively, the navigation system displays the local brand icon while using the predetermined shape indicating the category of business that associated with the local brand icon. In the present invention, the navigation system determines whether a particular local brand icon is likely to be unfamiliar with the user, and if so, the navigation system changes the local brand icon to a generic icon indicating the category of business that associated with the local brand icon when predetermined conditions are met.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for displaying icons for a navigation system, comprising the following steps of:

creating an icon database regarding generic icons and brand icons where a generic icon indicates a category of business and a brand icon indicates a specific business entity, said icon database including information for distinguishing a local brand icon that is only locally used or known from a national brand icon that is nationally used or known;

displaying the icons over a map image on a screen of the navigation system;

detecting whether there is any local brand icon displayed on the screen; and indicating a business category of a business entity using the local brand icon when the local brand icon is detected on the screen.

2. A method for displaying icons as defined in claim 1, wherein said step of indicating the business category includes a step of applying a color to the local brand icon where the color applied to the local brand icon is identical to that of a generic icon that shows a business category identical to that of the business entity using the local brand icon.

3. A method for displaying icons as defined in claim 2, wherein said step of applying a color to the local brand icon is conducted by incorporating a color frame around the local brand icon where the color of the color frame is identical to that of the generic icon.

4. A method for displaying icons as defined in claim 2, wherein said step of applying a color to the local brand icon is conducted by incorporating a background color to the local brand icon where the background color is identical to the color of the generic icon.

5. A method for displaying icons as defined in claim 1, wherein said step of indicating the business category includes a step of changing or applying a shape to the local brand icon so that the local brand icon and a generic icon that shows a business category identical to that of the business entity using the local brand icon have a shape identical to one another.

6. A method for displaying icons as defined in claim 1, wherein said step of indicating the business category includes a step of changing the local brand icon to a generic icon that shows a business category identical to that of the business entity using the local brand icon.

7. A method for displaying icons as defined in claim 1, wherein said step of indicating the business category includes a step of changing the local brand icon to a generic icon that shows a business category identical to that of the business entity using the local brand icon when a cursor is placed on or pointed to the local brand icon on the screen.

8. A method for displaying icons as defined in claim 1, further comprising a step of determining a home address of a user of the navigation system to evaluate whether a particular local brand icon on the screen is familiar to the user based on the home address.

9. A method for displaying icons as defined in claim 8, wherein said icon database includes information on locations associated with local brand icons, and wherein the locations associated with the local brand icons are used to evaluate whether a particular local brand icon on the screen is familiar to the user by comparing the home address of the user with the location of the particular brand icon.

10. A method for displaying icons as defined in claim 8, wherein said icon database includes information on locations associated with local brand icons where local brand icons are used or locations where business entities using the local brand icons exist, and wherein the information on the locations are used to evaluate whether a particular local brand icon on the screen is familiar to the user by comparing the home address of the user with the location of the particular local brand icon.

11. An apparatus for displaying icons for a navigation system, comprising:

means for creating an icon database regarding generic icons and brand icons where a generic icon indicates a category of business and a brand icon indicates a specific business entity, said icon database including information for distinguishing a local brand icon that is only locally used or known from a national brand icon that is nationally used or known;

means for displaying the icons over a map image on a screen of the navigation system;

means for detecting whether there is any local brand icon displayed on the screen; and means for indicating a business category of a business entity using the local brand icon when the local brand icon is detected on the screen.

12. An apparatus for displaying icons as defined in claim 11, wherein said means for indicating the business category includes means for applying a color to the local brand icon where the color applied to the local brand icon is identical to that of a generic icon that shows a business category identical to that of the business entity using the local brand icon.

13. An apparatus for displaying icons as defined in claim 12, wherein said means for applying a color to the local brand icon is conducted by incorporating a color frame around the local brand icon where the color of the color frame is identical to that of the generic icon.

14. An apparatus for displaying icons as defined in claim 12, wherein said means for applying a color to the local brand icon is conducted by incorporating a background color to the local brand icon where the background color is identical to the color of the generic icon.

15. An apparatus for displaying icons as defined in claim 11, wherein said means for indicating the business category includes means for changing or applying a shape to the local brand icon so that the local brand icon and a generic icon that shows a business category identical to that of the business entity using the local brand icon have a shape identical to one another.

16. An apparatus for displaying icons as defined in claim 11, wherein said means for indicating the business category includes means for changing the local brand icon to a generic icon that shows a business category identical to that of the business entity using the local brand icon.

17. An apparatus for displaying icons as defined in claim 11, wherein said means for indicating the business category includes means for changing the local brand icon to a generic icon that shows a business category identical to that of the business entity using the local brand icon when a cursor is placed on or pointed to the local brand icon on the screen.

18. An apparatus for displaying icons as defined in claim 11, further comprising means for determining a home address of a user of the navigation system to evaluate whether a particular local brand icon on the screen is familiar to the user based on the home address.

19. An apparatus for displaying icons as defined in claim 18, wherein said icon database includes information on locations associated with local brand icons, and wherein the locations associated with the local brand icons are used to evaluate whether a particular local brand icon on the screen is familiar to the user by comparing the home address of the user with the location of the particular brand icon.

20. An apparatus for displaying icons as defined in claim 18, wherein said icon database includes information on locations associated with local brand icons where local brand icons are used or locations where business entities using the local brand icons exist, and wherein the information on the locations are used to evaluate whether a particular local brand icon on the screen is familiar to the user by comparing the home address of the user with the location of the particular local brand icon.

* * * * *